United States Patent
Bhushan K N et al.

(10) Patent No.: US 7,594,221 B2
(45) Date of Patent: Sep. 22, 2009

(54) METHOD AND APPARATUS FOR TRANSLATING BINARY CODE

(75) Inventors: Keerthi Bhushan K N, Bangalore (IN); Dibyapran Sanyal, Uttar Pradesh (IN); Arijit Chatterjee, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 578 days.

(21) Appl. No.: 10/827,523

(22) Filed: Apr. 20, 2004

(65) Prior Publication Data

US 2005/0235269 A1    Oct. 20, 2005

(51) Int. Cl.
    G06F 9/45    (2006.01)
(52) U.S. Cl. ............... 717/136; 717/138; 717/146
(58) Field of Classification Search ............ 717/137
    See application file for complete search history.

(56) References Cited

U.S. PATENT DOCUMENTS

| | | | | |
|---|---|---|---|---|
| 5,560,028 A * | 9/1996 | Sachs et al. | ............ | 712/23 |
| 5,828,884 A * | 10/1998 | Lee et al. | ............ | 717/141 |
| 5,894,576 A * | 4/1999 | Bharadwaj | ............ | 717/156 |
| 6,075,937 A * | 6/2000 | Scalzi et al. | ............ | 703/23 |
| 6,519,768 B1 * | 2/2003 | Hughes et al. | ............ | 717/159 |

FOREIGN PATENT DOCUMENTS

| | | |
|---|---|---|
| EP | 0 706 125 | 4/1996 |
| EP | 1 033 650 | 9/2000 |

OTHER PUBLICATIONS

Baraz, L. et al. IA-32 Execution Layer: A Two-Phase Dynamic Translator Designed to Support IA-32 Applications on Itanium-based Systems, Dec. 3-5, 2003, pp. 191-201. [retrieved on May 22, 2009]. Retrieved from the Internet:<URL: http//ieeexplore.ieee.org/xpls/abs_all.jsp?arnumber=1253195.*

Cifuentes, C., Van Emmerik, M., Ramsey, N. The Design of A Resourceable and Retargetable Binary Translator, Proceedings, Sixth Working Conference on Reverse Engineering, Oct. 6-8, 1999, pp. 280-291. [retrieved on May 22, 2009]. Retrieved from the Internet:<URL: http://ieeexplore.ieee.org/xpls/abs_all.jsp?arnumber=806967.*

Altman et al., "Welcome to the Opportunities of Binary Translation," *IEEE Computer*, Mar. 2000, pp. 40-45, 33 (3).

* cited by examiner

*Primary Examiner*—Tuan Q Dam
*Assistant Examiner*—Cheneca P Smith

(57) ABSTRACT

A method of translating binary code instructions from a source format to a target format for processing by a target processor includes converting a source instruction into a source intermediate data structure having a plurality of members, mapping the members in the source intermediate data structure to corresponding members in a target intermediate data structure according to a template, and converting the target intermediate data structure into a target instruction.

32 Claims, 4 Drawing Sheets

| | Opcode | SrcReg2 | SrcReg1 | Condition | Direction | subpeode | | | | Width | Target |
|---|---|---|---|---|---|---|---|---|---|---|---|
| ADD | 0x02 | r2 | r1 | c | f | e1 | 1 | e2 | 0 | d | t |

Figure 2

| | Opcode | Condition | Direction | subopeode | Width |
|---|---|---|---|---|---|
| ADD R1,R2,R5 | 0x02 | 0 | 0 | 0x18 | 0 |
| ADD, <> *R1,R2, R5 | 0x02 | 1 | 1 | 0x18 | 1 |
| ADD, C, R1, R2, R5 | 0x02 | 0 | 0 | 0x1c | 0 |
| ADD, L*R1, R2, R5 | 0x02 | 0 | 0 | 0x28 | 1 |

Figure 3

```
.proc template _ADD_L_EQ
magic_04540            ::
Template_ADD_L_EQ      ::
{
.mii
            (p0) add    P.A_t  = PA_r1  ,PA_r2 ;;  // INSTR1
            (p0)        PT,pF  = r0     ,PA_t      // INSTR2
            cmp4.eq
            Nop.i                              ;;  // INSTR3
}
.endp
template_ADD_L_EQ
```

Figure 4

```
// To deposit bits 20:25 from a 32 bit Pa -RISC instruction "pa_instru", into bits 10:15 in 41 bit
// Itanium instruction "ia_instr":

((struct {u64 pad1:48;u64 f:6; u64 pad 2:10} *) &la_instr)  ->f =
                    ((struct {u32 pad1: 13;u32 f:6; u32 pad 2:21} *) & pa_instr)->f
```

Figure 5

```
//   Instr 1:     (p0)add          PA_t      =    PA_r1     , PA_r2
//   Instru 2:    (p0)cmp4.eq      p7,p6     =    r0        , PA_t
```

1. Add WAW edge between nodes (last_producer[PA -t], Instr 1)
2. Add RAW edge between nodes (last_producer[PA_r1], Instr 1)
3. Add RAW edge between nodes (last_producer[PA_r2], Instr 1)
4. Add RAW edge between notes (last_producer[qualifying -predicate], Instr 1)
5. Update Instr 1 as last_producer [PA_t]
6. Update Instr 1 as live_user [PA_t], live_user[PA_r1] and live_user [PA_r2]
7. Update miscellaneous information about Instr 1 (viz. Instr uction type, issue type, latency info etc). for use by schedular at runtime.

//   using the static invartant that there is a RAW dependency
//   between Instr 1, Instr 2 on PA_1

8. add Raw edge between nodes (Instr 1, Instr 2)
9. Add RAW edge between nodes (last -producer[qualifying -predicate], Inst 2)
10. Add WAW edge between nodes (last -producer[p6, Instr 2)
11. Add WAW edge between nodes (last -producer[p7], Instr 2)
12. Update Instr 2 as last_producer[p6], and last_producer [p7]
13. Update Instr 2 as live_user [PA_t]
14. Update miscellaneous information about Instr 2 (viz. Instruction type, issue type, latency info etc.) for use by scheduler at runtime.

Figure 6

| Name | PA-RISC Instructions Translated | Without Templates | | With Templates | | Translation Speedup |
|---|---|---|---|---|---|---|
| | | CPU Cycles Overhead (in million) | CPU Cycles per PA Instruction | CUP Cycles Overhead (in million) | CPU Cycles per PA Instruction | |
| Netscape | 1139954 | 1208 | 1060 | 232 | 204 | 25.19 |
| Acroread | 4427072 | 2190 | 579 | 549 | 126 | 4.55 |
| Java-Version | 21600959 | 314 | 145 | 571 | 26 | 5.50 |
| _200_check | 36295360 | 2855 | 78 | 547 | 14 | 5.27 |
| _201_Compress | 59032516 | 57197 | 968 | 12715 | 215 | 4.49 |
| Gzip | 132250 | 125 | 949 | 22 | 172 | 5.51 |
| Tar | 160691 | 176 | 925 | 33 | 176 | 5.23 |
| Ghostview | 534737 | 690 | 1291 | 120 | 224 | 5.74 |
| Gcc | 1343130 | 2085 | 1553 | 571 | 425 | 3.65 |
| Parser | 148075 | 251 | 1701 | 54 | 368 | 4.61 |

Figure 7

| Application | Time is Secs w/o Templates | Tim in Secs with Templates | Overall Speedup Factor |
|---|---|---|---|
| Netscape | 2.57 | 0.58 | 4.37 |
| Acrobat | 17.33 | 5.90 | 2.80 |
| Java – version | 34.29 | 5.89 | 5.82 |
| _200_check | 10.224 | 3.903 | 2.61 |
| _202_jess | 380.241 | 126.833 | 2.99 |
| _209_db | 1040.341 | 145.379 | 7.15 |
| _213_javac | 2602.306 | 822.393 | 3.16 |
| _227_mtrt | 452.022 | 111.609 | 4.11 |
| Gzip | 2.57 | 4.11 | 0.62 |
| Tar | 1.26 | 1.04 | 1.24 |
| Ghostview | 5.64 | 3.2 | 1.76 |
| Gcc | 474 | 614 | 0.77 |
| Parser | 1217 | 1228 | 1.00 |

Figure 8

METHOD AND APPARATUS FOR TRANSLATING BINARY CODE

FIELD OF INVENTION

The present invention relates to a method and apparatus for translating binary code. More particularly, but not exclusively, the present invention relates to a method and apparatus for translating binary code dynamically, that is, at the run time of the code.

BACKGROUND OF THE INVENTION

The term platform is used to refer to a processor/hardware and operating system combination. Binary translators allow binaries built for a particular platform (source) to execute on another platform (target) by translating the machine instructions present in the binary code into equivalent instructions of the target platform. Binary translation can be performed either statically, wherein a new binary image is created for running directly on the target platform, or dynamically wherein the translation takes place while the binary is executed. Different types of binary translators are described by Erik R. Altman, David Kaeli, and Yaron Sheffer, in "Welcome to the Opportunities of Binary Translation.", IEEE Computer, 33 (3), March 2000, pp 40-45.

Dynamic binary translators (DBTs) follow the execution path of the source binary, perform on-the-fly translation, store the translated code in a translation cache and finally execute the translated code. The translation may be stored in memory, as described by C. Zheng and C. Thompson in "PA-RISC to IA-64: Transparent execution, no recompilation.", IEEE Computer, 33(3):47-52, March 2000. Alternatively, the translation may be stored on disk for use across executions of the same binary as described by R. J. Hookway and M. A. Herdeg.in "Digital FX!32: Combining emulation and binary translation.", Digital Technical Journal, 9(1):3-12, 1997.

Conventional DBTs translate machine instructions from source to target platform using the following phases:
  Decode the input instruction
  Select target instructions
  Optimize the selected instructions
  Emit the optimized code into translation cache The translated code produced by such DBTs is native to the processor on which it is to be run and as such, can provide performance close to native compiled binaries. However, for this to be the case the cost of translation, which is an overhead on the runtime of the binary needs to be minimised while not compromising on quality of generated code. This is discussed further by M. Probst, in "Fast machine-adaptable dynamic binary translation.", Proceedings of the Workshop on Binary Translation, Barcelona, Spain, September 2001.

The cost of translation can be high if frequently executed or "hot" segments of code are not translated into native code. Most known binary translators use a combination of emulation and translation to determine "hotness" of various parts of the binary, switching from emulation to translation at a threshold point in an attempt to make the process more efficient.

DBTs are commonly used as a migration tool and to run a large variety of applications. However, many applications have poor code locality and cause frequent extraneous events that expose translation overhead as the most significant performance bottleneck. One such event is the flushing of the translation cache. A DBT may be forced to flush the translation cache whenever the emulated application loads or unloads new shared libraries, encounters a Flush Cache (FIC) instruction (e.g. dynamic loader, Java Virtual Machine), or when the translation cache is full. Frequently flushing the translation cache leads to re-translation of hot segments of code increasing the total translation overhead.

Frederick Smith, Dan Grossman, Greg Morrisett, Luke Homof, & Trevor Jim, "Compiling for run-time code generation (extended version).", Technical Report, October 2000, Department of Computer Science, Cornell University, describes the Cyclone programming language that provides explicit support for dynamic specialization of Cyclone routines using precompiled templates and a facility for optimising the templates. Also, Masuhara, H. and Yonezawa, A. "Run-time Bytecode Specialization: A Portable Approach to Generating Optimized Specialized Code.", Lecture Notes in Computer Science, 2001, describes a run-time technique that operates on bytecode programs in Java Virtual Machine Language. Using this technique the Java bytecode programs are specialized and optimised at runtime. Both these efforts exploit the greater information available at runtime to specialize (or partially evaluate) the program thereby improving performance. However, such optimizations are opportunistic and cannot be applied for all input situations.

A significant part of the binary translation process is the transformation of data from the source instruction to the target instruction in a process referred to as bit filling. In known translators, whenever bit filling is carried out in high level code, the process typically involves the following steps:
  a) Shift the required bits into the target position.
  b) Mask out those bits, which are not required
  c) The bits in the target corresponding to those bit positions where the new bits have to be copied into need to be cleared.
  d) The source bits are copied into the target by an OR binary operation.

If the source instruction bit sequence is such that it needs to be split up and copied into different positions in the target, then the steps above need to be carried out for each subset of bits that are to be copied into a unique location in the target. This results in a significant performance loss. Also, when the DBT is translating code from one format to another, the source bit patterns may need to be split and copied into various target instruction slots, thereby further reducing performance.

Another known solution to bit filling is inline assembly, which is provided by some compilers. This facility enables the user to code efficient assembly routines into the otherwise high-level language code. However, this solution is platform specific, and requires the programmer to know the instruction set architecture of every processor on which the binary has to execute. Furthermore, inline assembly can restrict possible compiler optimizations.

In summary, decoding and analysis of source instructions using traditional DBTs incurs a significant performance overhead resulting in the translated programs running less efficiently.

It is an object of the present invention to provide a method and apparatus for translating binary code, which avoids some of the above disadvantages or at least provides the public with a useful choice.

SUMMARY OF THE INVENTION

According to a first aspect of the invention there is provided a method of translating binary code instructions from a source format to a target format for processing by a target processor, the method comprising the steps of:
  a) Identifying a source instruction;

b) Selecting a translation template corresponding to the identified source instruction, the template providing a set of target format instructions semantically equivalent to the identified source instruction; and c) Translating the identified instruction in accordance with the template; and d) Outputting the translated instruction for processing by the target processor.

Preferably the source and target instructions include a control part and a data part and the control part being used in the identification step to identify an instruction. Preferably the method comprises a transformation step in which the data part from the source instruction is transformed into the corresponding data part or parts of the set of target format instructions. Preferably the transformation step is carried out in accordance with a bit filling routine associated with the template. Preferably the bit filling routine is uniquely associated with the template. Preferably the transformation step is arranged to transform data of one type of endianness to data of another type of endianness.

Preferably the source instruction control parts are each concatenated to provide a unique identifier and the templates are indexed in accordance with the identifiers. Preferably the templates are indexed by the unique identifiers in a look up table. Preferably the translation is carried out at runtime of an emulated application program.

Preferably the templates are provided by software procedure calls. Preferably the source format is 32 bit and the target format is 64 bit. Preferably the source format is PA-RISC code and the target format is Itanium™ code.

Preferably the method is provided by a computer program for translating binary code instructions from a source format to a target format for processing by a target processor. Preferably the templates are implemented as routines in the computer program. Preferably the computer program is operable to carry out the translation at the runtime of the code.

According to a second aspect of the invention there is provided apparatus for translating binary code instructions from a source format to a target format for processing by a target processor, the apparatus comprising:

a) An instruction identifier for identifying a source instruction;

b) A template selector for selecting a translation template corresponding to the identified source instruction, the translation template providing a set of target format instructions semantically equivalent to the identified source instruction; and c) A translator for translating the identified instruction in accordance with the template; and d) An output buffer for outputting the translated instruction for processing by the target processor.

According to a third aspect of the invention there is provided a template for use in a binary code translator for translating binary code instructions from a source format to a target format for processing by a target processor, the template comprising:

a) A template identifier uniquely associating the template to a source instruction; and b) A set of instructions in the target format semantically equivalent to the source instruction.

BRIEF DESCRIPTION OF THE DRAWINGS

Embodiments of the invention will now be described, by way of example only, with reference to the accompanying drawings in which:

FIG. 2 is a table illustrating the format of an instruction for input to the process of FIG. 1;

FIG. 3 is a table illustrating variants of the format of the instruction of FIG. 2;

FIG. 4 shows a template used in the translation process of FIG. 1;

FIG. 5 shows a code routine used in the translation process to transfer data from an input instruction into the set of output instructions;

FIG. 6 shows a code routine used for defining dependence information for optimising translated code for use in a parallel processing execution environment;

FIG. 7 is a table showing the translation speed performance of a template based DBT against a conventional DBT; and FIG. 8 is a table showing application program performance of a template based DBT against a conventional DBT.

DETAILED DESCRIPTION OF A PREFERRED EMBODIMENT OF THE INVENTION

Figure 1:
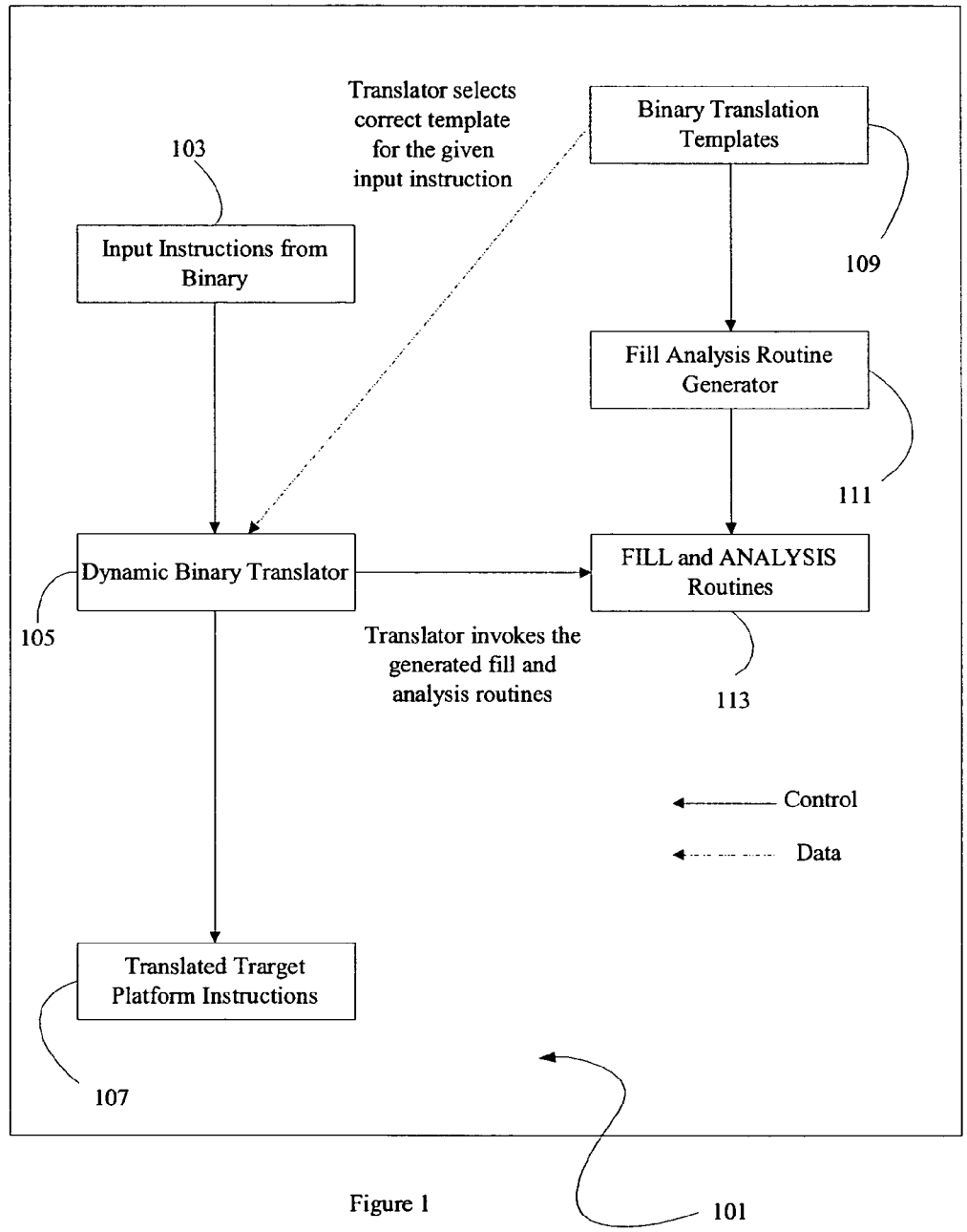
FIG. 1 is a schematic illustration of a template based dynamic binary translation process.

FIG. 1 shows the template based dynamic binary translation system 101 in which instructions in a source code format 103 are input into the DBT 105 and output as translated target code format instructions 107 for processing on a target processor. The system 101 includes a set of templates 109 which are used by the DBT to map instructions in the source format to a set of instructions in the target format. A fill and analysis routine generator 111 uses the templates 109 to generate a set of fill and analysis routines 113, which will be described in further detail below. The templates and the fill and analysis routines are compiled along with the translator to produce the working DBT.

The DBT in the present embodiment is arranged to translate between PA-RISC and Itanium™ assembly code formats. HP™-UX (a version of Unix from Hewlett Packard) is based on PA-RISC 2.0 processors. Itanium™ assembly code is used with Intel's 64 bit Itanium™ processor (see Intel Corp., Itanium™ Architecture Software Developer's Manual, February 2000, URL http://developer.intel.com/design/Itanium™/family.).

For any given hardware architecture, machine instructions can be divided into two distinct parts. The first part is the control part that determines the action the hardware would perform while executing the instruction. FIG. 2 shows the format of the ADD instruction from the PA-RISC assembly code. The opcode, sub-opcode, condition, width and direction fields constitute the control part of ADD instruction. These fields can have a fixed set of values and permuting them with different values generates all valid variants of the ADD instruction that can appear in PA-RISC binary code. There are 160 variants of the ADD instruction each with a different semantics. However, for sub-opcode field, not all combinations are supported in hardware, as noted in the PA-RISC instruction manual by Gerry Kane, PA-RISC 2.0 architecture, Prentice Hall, 1996. FIG. 3 shows some of the possible variants of the PA-RISC ADD instruction.

The second part of the instruction is the data part, which comprises register numbers, encoded immediate values etc, which are specific to each instance of an instruction. For the ADD instruction in FIG. 2 the data parts are the register numbers for two sources and one target register. The number of valid values that the data part can contain is from a much larger set than those for control part. For example, a 22-bit immediate data field may contain any of $2^{22}$ values. These values are not known until the translator encounters a particular instance of the instruction.

The control part of all instructions in the source format instruction set is known statically, that is prior to the run time of translated code. Using this fact it is possible to list all variants of the entire input instruction set and for each variant construct a translation in the target platform instructions set. These translations are represented in the templates, which capture the semantics of the input instruction without specifying the data parts. In the present embodiment, the templates are written as Itanium™ assembly language routines. These routines are accessed through a table, which maps a unique id for each instruction variant to the corresponding template.

In the PA-RISC instruction set, the number of instruction variants is about 2600 and each requires a template and a corresponding data fill routine. As noted above, the fill routines extract the various data parts from the input instruction and deposit them into the template. The fill routines are constructed automatically by a process that analyses the templates using the source and target binary instruction formats. This process is described in further detail below.

FIG. 4 shows the template for the ADD instruction variant "ADD, L, =r1, r2, t" in Itanium™ assembly. This variant performs logical addition (without carry) of register r1 and r2 and places the result in register t. Additionally, if the result is 0, then the next instruction is nullified. In the assembly code in FIG. 4, the first instruction performs the addition, while the second sets predicate registers pT to 0 and pF to 1 if the result register is equal to 0. These predicate registers are used to nullify the next template.

During translation, the fields PA_r1, PA_r2 and PA_t are filled with the source and target operands from the input instruction. These fields correspond to the PA-RISC register mapped as native registers of Itanium™ (see C. Zheng and C. Thompson. PA-RISC to IA-64: Transparent execution, no recompilation. Computer, 33(3): 47-52, March 2000). Also the fields pT and pF are filled with those predicate registers that are used for nullifying the next template. In the present embodiment, in order to compile the template into the DBT, dummy values are used for all the fillable positions.

The template contains meta-data used in the generation of the fill routines. For example, the template in FIG. 4, the name of the template "template_ADD_L_EQ" identifies the PA-RISC instruction completely. The second line contains a label with the keyword "magic_<template-id>". Template-id is a unique number obtained by concatenating the various control parts of ADD, L, =r1, r2, t. The translator constructs the template-id from the input instruction and uses that to identify the correct template and fill routine.

Compared to conventional binary translation, template based translation progresses as follows:

Extract from input instruction its control part to form a unique template ID

Populate the template identified by this ID using data parts from input instruction Perform optimization (e.g. code scheduling) on populated template Emit the optimized code to translation cache Generating the Fill Routines The fill routine generator 111 identifies the fillable positions within a template by parsing it, and generates code to extract and deposit the fields from input PA-RISC instruction into the precompiled Itanium™ template. In cases where the input field does not come from the PA-RISC instruction, such as the predicate registers or temporary registers, the generated code contains references to translator internal data or register allocators.

To generate the extract and deposit code the fill routine generator uses information on the instruction encoding formats of the source and target machines captured in tables. Each source and target instruction name is mapped to the appropriate encoding format. The fill routine generator also takes in to differences in endianness, for example, PA-RISC binary contains instructions in big-endian format whereas Itanium™ pre-compiled templates are stored in little-endian format. In addition, HP™-UX operates in big-endian mode on Itanium™ processors. While converting each Itanium™ bundle into big endian, depositing the fillable positions and converting back into little endian is possible, but not preferred due to the high latencies involved in such conversion. Instead, the fill routine generator is arranged to compute the bit positions of operands apriori, after conversion into little endian format.

When bit-filling runtime operands into precompiled machine code it is important that the operation incurs minimum cost with respect to time. Carrying out the minimum number of operations when extracting the source operands and depositing them into the required bit positions in the target code helps to achieve this minimum cost. In the DBT, the bit-filling operation has the following basic steps:

a) Extract runtime operand value from instruction being emulated.

b) Calculate the target bit positions (or sets of bit positions) where the operands have to be bit-filled.

c) Fill the bits into the positions identified in step (b)

Itanium™ hardware offers extract 'extr' and deposit 'dep' instructions that are used by the fill routines to efficiently extract PA-RISC operands and deposit them into the Itanium™ template. In order to ensure that these instructions are actually generated by the compiler the fill routine code is written as illustrated in FIG. 5. The operand bit positions being accessed are expressed as a bit-field within an unnamed structure type casted on the data item containing the Itanium™ or PARISC instruction. Accessing field "f" on RHS of the C statement in FIG. 5 causes an 'extr' instruction to be generated by the compiler from bits 20:25 of "pa_instr". Similarly on LHS, a 'dep' instruction is generated for bits 10:15 of "ia_instr". Since the field widths within the unnamed structure are computed automatically, the fill routine code is highly reliable. This technique leads to significant performance gains in template filling further reducing the translation overhead.

In the DBT of the present embodiment the PA-RISC instruction streams are read, the runtime values are extracted from them and filled into a set of Itanium™ (IA64) instructions. The DBT is implemented in the C language and so C language structures are used to implement the bit-filling mechanism. All the PA-RISC instructions are modeled as C data structures so that the total size of the structure is the same as the size of the instruction, which is 32 bits for PA-RISC. Each component of the instruction is defined as a separate member of the data structure (or struct). For example, the PA-RISC ADD instruction has the following format:

| Bits 0-5 | 6-10 | 11-15 | 16-18 | 19 | 20 | 21 | 22, 23 | 24, 25 | 26 | 27-31 |
|---|---|---|---|---|---|---|---|---|---|---|
| 02 | R2 | R1 | C | F | E1 | 1 | E2 | 0 | D | t |

This instruction results in t=r1+r2. This instruction is modeled in C as:

```
typedef struct pa_format_8
{
    u32 PA_op:6;
    u32 PA_r2:5;
    u32 PA_r1:5;
    u32 PA_pad:11; /* all control bits, not operands */
    u32 PA_t:5;
} pa_format_8;
```

Similarly, the IA-64 instructions are modeled as a structure. But since the IA-64 is not a RISC processor, the structure formation is not as simple. The IA-64 instruction stream consists of a sequence of "bundles" each of which is 128 bits wide, and contains three IA-64 instructions each of which is 41 bits wide and occupies one of the three "slots" in the bundle. The remaining 5 bits define the bundle type. Also, subject to certain restrictions any instruction can be in any position in the bundle e.g. a IA-64 add instruction could be in slot 1, 2 or 3 in a Memory Memory Integer (MMI) type bundle. The format of a IA-64 add instruction is as below:

| Bits 40 to 38 | 37 to 21 | 20 to 14 | 13 to 7 | 6 to 0 |
|---|---|---|---|---|
| Precompiled (pcd) | R3 | R2 | R1 | Qp |

The semantic of the above instruction when precompiled as an ADD instruction is r1=r2+r3 if qp==TRUE. The next step is to map PA_r1 into r2, PA_r2 into r3 and PA_t to r1. Since the IA64 is little endian, these instructions are arranged in memory as shown below for slot 1 (the same logic can be used to extrapolate the positions for slot 2 & 3):

| Byte 1 | Byte 2 | Byte 3 | Byte 4 | Byte 16 |
|---|---|---|---|---|
| [r1(1:0)|qp(0:5)] | [r2((2:0)|r1(6:2)] | [r3(3:0)| r2(6:3)] | [PCD| r3(6:4)] | [ . . . ] |

Since C language allows individual variables to be a maximum of 64 bits wide, the above 128-bit bundle is modeled as two 64-bit structures. The first structure is modeled as:

```
struct Bundle_0_63 {
    u64  r1_1_0:2;
    u64  qp :6;
    u64  r2_2_0:3;
    u64  r1_6_2:5;
    u64  r3_3_0:4;
    u64  r2_6_3:4;
    u64  pcd_1 :5;
    u64  r3_6_4:3;
    /* \
     * |Bundle 2
     * |data
     */ /
}
```

The final size of this structure is 64-bits and it mirrors the first 64-bits of a bundle. Therefore, the C code for extracting and depositing the values of PA_r1, PA_r2 and PA_r3 into the IA-64 bundle at runtime is:

```
((struct Bundle_0_63 *)IA_64_bundle_0_63)->r1_1_0 =
    ((pa_format_8 *)PA_instruction)->PA_t;
((struct Bundle_0_63 *)IA_64_bundle_0_63)->r1_6_2 =
    ((pa_format_8 *)PA_instruction)->PA_t >> 2;
((struct Bundle_0_63 *)IA_64_bundle_0_63)->r2_2_0 =
    ((pa_format_8 *)PA_instruction)->PA_r1;
((struct Bundle_0_63 *)IA_64_bundle_0_63)->r2_6_3 =
    ((pa_format_8 *)PA_instruction)->PA_r1 >> 3;
((struct Bundle_0_63 *)IA_64_bundle_0_63)->r3_3_0 =
    ((pa_format_8 *)PA_instruction)->PA_r2;
((struct Bundle_0_63 *)IA_64_bundle_0_63)->r2_6_4 =
    ((pa_format_8 *)PA_instruction)->PA_r2 >> 4;
```

The compiler is arranged to issue only an extract and a deposit even when there are shifts present in the C code, by adjusting the extract position. In this way, we can use standard high-level language structures to enable the compiler to generate efficient code for moving some bits from one location to another.

DBT Build and Operation

The build and compilation process of the DBT is summarised as follows:

1. Create a repository of magic numbers. As noted above, a magic number is a unique integer that represents one and only one variant of a source instruction. The collection of all the magic numbers represents the set of all valid instructions possible of the source instruction set. The result of this stage is a set of constants associating a unique string with a unique integer, wherein the string shortly describes the instruction variant, which the magic number is supposed to represent.

2. Create a template repository. As noted above a template is a functionally equivalent sequence of target architecture instructions, for each source instruction. A template assumes temporary native registers for its operations and is compiled (at the DBT's compile time) as a function whose name will be derived from the corresponding magic number's associated string mentioned in 1 above. The templates are available as a routine/function at runtime.

3. Create a table, indexed on magic numbers, containing the references to the corresponding templates. At runtime the translator picks up the appropriate template for a given instruction after ascertaining its magic number as described below.

4. Create template filler routines repository in which each template filler routine (TFR) has the knowledge of both the source and target instructions. The TFR of a given template extracts the dynamic components of the source instruction (registers, immediates etc) and fills the extracted items in the in-memory template to replace the corresponding "place-holders". The translator calls the TFR for a given instruction at run-time. The TFR repository is linked to corresponding templates and magic numbers.

5. Create minimal decode/magic-number-extractor routines repository (MNE routines). An MNE routine, given a raw source instruction, returns the magic number of that instruction. Each MNE routine is written in assembly by hand for maximum optimity.

6. The resources in steps 1 to 5 are compiled together to prepare the DBT. At run time the DBT carries out the following steps:

a) DBT receives a source instruction Si.

b) DBT maps the Si to appropriate MNEi and calls MNEi with Si as a parameter.

c) MNEi returns magic number mi.

d) DBT maps mi to template ti.

e) Copy ti to the code generation buffer b (in-memory).

f) DBT maps mi to TFRi.

g) DBT calls TFRi and passes to it b and Si as parameters. (The TFRi extracts dynamic components of Si and fills in the ti found at address b).

h) Go to S(i+1) if the current block is not yet finished (block end may be defined as needed by the user. Generally a control transfer instruction such as a branch or a jump ends a block—called basic block in compiler terminology).

i) Optimise the sequence of instructions in the buffer b for best temporal performance.

j) Emit optimised code from buffer b to code cache Ci where the instructions will be processed by the processor.

Generating Analysis Routines

The templates contain dependency information that is used in a code scheduler for the generated code. The scheduler exploits the multiple issue capabilities offered by the Itanium™ hardware, that is the parallel processing capability. Apart from the fillable fields, each template is complete in terms of data dependencies (Read-After-Write (RAW), Write-After-Write (WAW) and Write-After-Read (WAR)) and the bundling requirements of Itanium™. As a result, the analysis routine generator 111 can generate code statically for use by the scheduler in dependency analysis. The generated routines are called analysis routines.

With reference to FIG. 4, the resource PA_t, of the second instruction has a Read-After-Write (RAW) dependency on the first instruction irrespective of the value of PA_t. This invariant is identified by the analysis routine generator, thus saving the cost of determining this dependency at runtime. The scheduler represents dependency information using a Directed-Acyclic-Graph (DAG) and therefore the analysis routine generator generates code that adds a RAW edge between the nodes for first and second instruction.

The analysis routine generator does not have access to some values such as those of PA_t, PA_r1 and PA_r2. In this case the analysis routine generator generates dependency analysis code using input and output resources named in the template. For example, in FIG. 4, code to add a RAW edge between the last producer of PA_r1 and the first instruction is generated. Similarly code to add a Write-After-Write (WAW) edge between the last producer of PA_t and the first instruction is also generated. Such code discovers all dependencies without having to identify the input and output resources of an instruction at runtime.

FIG. 6 shows the output of the analysis routine generator 111 for the template ADD_L_EQ shown in FIG. 4. The code speeds up dependency analysis in the Itanium™ code scheduler. This code identifies a significant subset of dependencies within instructions in a single template and generates appropriate DAG edges. The code for complete dependency analysis does not attempt to determine the input/output set of instructions being analyzed, since this information is already available to the fill and analysis routine generator.

The analysis routine generator carries out the following process:

1. Invokes the analysis routines for each translated template.

2. The analysis routine performs dependency analysis and assigns each instruction into the earliest group (Instruction Group in Itanium™ terminology) respecting all dependencies. A Group is defined as a set of instructions, all of which can be issued in parallel.

3. For each group, construct the instruction bundles for parallel issue according to Itanium™ rules.

4. Emit the bundled code into the translation cache for execution.

Using the generated analysis routines saves the cost of figuring out input/output sets of instructions being analyzed. Further, code in analysis routine is optimum because it is constructed by examining the specific instructions being scheduled from the template. In other words, the analysis routines are a specialization or partial evaluation of the code for a traditional scheduler using the templates as input. Since the collections of templates form the complete set of inputs to the scheduler, this system is correct and complete.

In an alternative embodiment, the step of building the DAG is omitted. Instead, a counter is kept and is associated with each instruction to indicate the group number to which the instruction belongs. This counter is incremented every time an edge is discovered. The counter computes the earliest group to which a given instruction can be assigned such that all producers of its input (for RAW) and output (for WAW) resources have already been assigned to previous groups. The basic algorithm is given in the following expression:

Group(instr1) = max{ Group(last_producer[Res]) | Res _Input(Instr1) U Output(instr) }

This embodiment offers a lightweight and fast scheduler for Itanium™ that works with template based translation.

Optimisations in Template Based Translation

Template based dynamic binary translation creates opportunities for optimizations by speeding up the basic translation process. Using template-based translation it is possible to employ a fast translator with minimal optimizations. Alternatively, with same translation cost as that of a conventional DBT, more sophisticated optimizations can be targeted.

In a further embodiment, apart from scheduling, peephole optimizations that need pattern matching are performed. Some target architectures offer a single instruction to complete a task that takes multiple instructions on the source architecture. One such case is division operation in PA-RISC code, which requires a long sequence of divide-step (DS) instructions. However, on Itanium™ the sequence of DS instructions can be replaced by a much shorter sequence using floating-point reciprocal approximation (FRCPA) instructions. To detect a pattern of DS instructions from the input instruction stream is a heavyweight operation in a conventional DBT because to detect a pattern in machine instructions, the control part of input instructions must be matched to a known sequence. In conventional translation this needs to be separately constructed whereas in the present embodiment with template based translation, the stream of unique template-ids from input instructions are matched against the known sequence.

Template based translation proceeds with minimal decision points because a onetime construction of the template-id is sufficient to determine which instructions to emit. In a conventional translator, instruction selection happens by examining bits within the input instruction in a hierarchical manner leading to many control transfers. The ability to deal directly with precompiled binary code removes the conventional need for an intermediate representation (IR) and conversion from the IR to binary format. However, removing the IR can severely restrict ability to perform analysis and optimizations at translation time. Embodiments of the invention alleviate this restriction by using the static representation of the template as the IR and using the analysis routine generator to generate code for performing optimizations. This generated code can be treated as a partial evaluation or specialization of similar code in a conventional optimizer. Since the collection of all templates form the entire set of inputs to an optimizer, such specialization leads to optimal and complete code.

Performance of Template Based Translation

FIG. 7 shows data, which provides a comparison of the performance characteristics of an embodiment of the invention against a conventional DBT. The data shown is without scheduling using a computer with a 4-way Itanium2™ processor running at 900 MHz with 8 GB of physical memory. Since template based DBTs offer high-speed translation, one key measure is the average number of CPU cycles consumed by the translator to translate one input instruction. This is measured with different types of applications:

Simple utilities such as ls, tar, gzip, ghostscript™;
Computationally intensive programs from the SPEC2000 suite;
Java Virtual Machine™ (JVM) using the SPECJVM98 suite; and
I/O intensive applications like Netscape™.

From the data in FIG. 7 it can be seen that with the template based translation, there is an average reduction of 4 to 5 times in translation overhead across a spectrum of applications. Although all applications show significant gain in translation overhead, the performance gained in total runtime depends on the ratio of translation overhead to the total runtime. Data for this is shown in FIG. 8. For compute intensive SPEC2000 applications the gain is minimal, as for these applications translation time is a very small percentage of total runtime. However, for Java™ applications from SPECJVM98 suite, translation time is a significant portion of total runtime. In case of JVM and Java™ applications, there is a gain of 250% to 400% on the total runtime. For one application '_209_db' from SPECJVM98 suite, the gain is as high as 700%. Although the gain in Java applications is accentuated by the frequent translation-cache flushes caused by JVM, it is independent of the algorithm used to decide if a flush is required. For other applications the gain ranges from 0 to 3000%. There are some applications like 'gcc' and 'gzip' that perform poorer than the conventional DBT. This is due to analysis like d-u chain analysis for carry-borrow bit updation.

One of the problems in dynamic binary translation is the cost of translation and optimization over execution of the translated code. The problem is particularly severe in applications that have poor code locality or frequently cause a translation-cache flush. Template based translation offers significant reduction in translation overhead without compromising code quality or flexibility to perform optimizations. It also facilitates automatic generation of optimized fill and analysis routines.

From the above description it can be seen that the heavyweight instruction selection stage of a conventional DBT is replaced by a lightweight phase of populating the selected template, which is a series of bit filling operations into the compiled binary code. Further, instruction decoding in conventional dynamic binary translator is hierarchical and involves lots of control transfer whereas in template based translation it amounts to extracting certain bits from the input instruction to form the unique template ID. Due to these improvements template based translation offers a significant reduction in translation overhead.

The above embodiments are described with reference to the PA-RISC and Itanium platforms. However, embodiments of the invention include translators that operate between any platform or processor types. The source or target processors or code sets may be 32-bit or 64-bit, reduced instruction set processors (RISC), complex instruction set processors (CISC), explicitly parallel instruction processors (EPIC) or very large instruction word processors (VLIW).

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via various transmission or storage means such as computer network, floppy disc, CD-ROM or magnetic tape so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method of translating binary code instructions from a source format to a target format for processing by a target processor, said method comprising the steps of:
   identifying a source instruction;
   selecting a translation template corresponding to said identified source instruction, said template providing a set of target instructions semantically equivalent to said identified source instruction;
   translating said identified source instruction in accordance with said template, wherein said translating comprises:
      converting said identified source instruction into a source intermediate data structure having a plurality of members;
      mapping said members in said source intermediate data structure to corresponding members in a target intermediate data structure according to said template; and
      converting said target intermediate data structure into a target instruction; and
   outputting said target instruction for processing by said target processor.

2. A method according to claim 1 in which said source and target instructions each include a control part and a data part and said control part of said source instruction being used in said identification step to identify said source instruction an instruction.

3. A method according to claim 2 wherein said data part from said source instruction is transformed into said corresponding data part or parts of said set of target instructions.

4. A method according to claim 3 in which said transformation step is carried out in accordance with a bit filling routine associated with said template.

5. A method according to claim 4 in which said bit filling routine is uniquely associated with said template.

6. A method according to claim 3 in which said transformation step is arranged to transform data of one type of endianness to data of another type of endianness.

7. A method according to claim 2 in which said source instruction control parts are each concatenated to provide a unique identifier and said templates are indexed in accordance with said identifiers.

8. A method according to claim 7 in which said templates are indexed by said unique identifiers in a look up table.

9. A method according to claim 1 in which said translation is carried out at runtime of an emulated application program.

10. A method according to claim 1 in which said templates are provided by software procedure calls.

11. A method according to claim 1 in which said source format is 32 bit and said target format is 64 bit.

12. A method according to claim 1 in which said source format is PA-RISC code and said target format is Itanium™ code.

13. An apparatus for translating binary code instructions from a source format to a target format for processing by a target processor, the apparatus comprising:
   at least one processor configured to execute code embodied on a computer readable medium;
   an instruction identifier embodied within said code for identifying a source instruction;
   a template selector embodied within said code for selecting a translation template corresponding to said identified source instruction, said translation template comprising a set of target instructions semantically equivalent to said identified source instruction and further comprising input and output resources; and
   a translator embodied within said code for translating said identified source instruction, wherein said translator is configured to
      convert said identified source instruction into a source intermediate data structure having a plurality of members;
      map said members in said source intermediate data structure to corresponding members in a target intermediate data structure according to said template; and
      convert said target intermediate data structure into a target instruction; and
   an output buffer embodied within said code for outputting said target instruction for processing by said target processor.

14. Apparatus according to claim 13 in which said source and target instructions each include a control part and a data part and said instruction identifier uses said control part of said source instruction to identify said source instruction.

15. Apparatus according to claim 14 in which said translator is operable to transform said data part from said source instruction into said corresponding data part or parts of said set of target instructions.

16. Apparatus according to claim 15 in which said transformation is carried out in accordance with a bit filling routine associated with said template.

17. Apparatus according to claim 16 in which said bit filling routine is uniquely associated with said template.

18. Apparatus according to claim 15 in which translator is operable to transform data of one type of endianness into data of another type of endianness.

19. Apparatus according to claim 14 in which said source instruction control parts are concatenated to provide a unique identifier and said templates are indexed in accordance with said identifiers.

20. Apparatus according to claim 19 in which said templates are indexed by said unique identifiers in a look up table.

21. Apparatus according to claim 13 in which said translation is carried out at runtime of an emulated application program.

22. Apparatus according to claim 13 in which said templates are provided by software procedure calls.

23. Apparatus according to claim 13 in which said source code has a 32 bit format and said target code has a 64 bit format.

24. Apparatus according to claim 13 in which said source code is PA-RISC code and said target code is Itanium™ code.

25. A computer program product for translating binary code instructions from a source format to a target format for processing by a target processor, comprising a computer-readable medium, further comprising:
   a template embodied within said computer-readable medium for use in a binary code translator for translating binary code instructions from a source format to a target format for processing by a target processor, the template comprising:
      a template identifier for uniquely associating said template to a source instruction;
      a set of target instructions in a target format semantically equivalent to the source instruction;
   computer usable program code embodied within said computer-readable medium configured to convert said source instruction into a source intermediate data structure having a plurality of members;
   computer usable program code embodied within said computer-readable medium configured to map said members in said source intermediate data structure to corresponding members in a target intermediate data structure according to said template; and
   computer usable program code embodied within said computer-readable medium configured to convert said target intermediate data structure into a target instruction.

26. A computer product according to claim 25, further comprising a set of codes causing a computer to derive the template identifier from a control part of the source instruction.

27. A computer product according to claim 26, wherein the template causes a computer to transform a data part of the source instruction into at least one corresponding data part of the set of target instructions.

28. A computer product according to claim 27, further comprising a set of codes for causing a computer to bit fill the data part of the source instruction.

29. A computer product according to claim 26, wherein the template causes a computer to create the template identifier by concatenating the control part of said source instruction.

30. A computer product according to claim 25, wherein the template causing a computer to transform a source instruction having a 32 bit format to a target instruction having a 64 bit format.

31. A computer product according to claim 25, wherein the template causes a computer to transform PA-RISC source code into Itanium™ target code.

32. A computer program product for translating binary code instructions from a source format to a target format for processing by a target processor, comprising:
  a computer-readable medium, comprising:
    a first set of codes for causing a computer to identify a source instruction;
    a second set of codes for causing a computer to select a translation template corresponding to said identified source instruction, said template providing a set of target format instructions semantically equivalent to said identified source instruction;
    a third set of codes for causing a computer to translate said identified source instruction in accordance with said template by converting said identified source instruction to an intermediate source data structure, mapping members of said intermediate source data structure to a members of a target intermediate data structure according to said template, and converting said target intermediate data structure into a target instruction; and
    a fourth set of codes for causing a computer to output said translated instruction for processing by said target processor.

* * * * *